US005989434A

United States Patent [19]

Lundquist et al.

[11] Patent Number: 5,989,434

[45] Date of Patent: Nov. 23, 1999

[54] METHOD FOR REMOVING METAL IONS FROM SOLUTION WITH TITANATE SORBENTS

[75] Inventors: Susan H. Lundquist, White Bear Township; Lloyd R. White, Minneapolis, both of Minn.

[73] Assignee: 3M Innovative Properties Company, St. Paul, Minn.

[21] Appl. No.: 08/960,528

[22] Filed: Oct. 31, 1997

[51] Int. Cl.$^6$ .................... B01D 15/04

[52] U.S. Cl. .................... 210/679; 210/682; 210/688

[58] Field of Search .................... 210/679, 682, 210/688, 681, 687, 912, 914

[56] References Cited

U.S. PATENT DOCUMENTS

| | | | |
|---|---|---|---|
| 3,296,123 | 1/1967 | Prout et al. | 210/38 |
| 4,138,336 | 2/1979 | Mendel et al. | 210/198 C |
| 4,400,305 | 8/1983 | Takeuchi et al. | 210/679 |
| 5,128,291 | 7/1992 | Wax et al. | 502/8 |
| 5,200,378 | 4/1993 | Clearfield | 502/62 |
| 5,298,166 | 3/1994 | Bray et al. | 210/679 |
| 5,397,476 | 3/1995 | Bradbury et al. | 210/675 |
| 5,407,889 | 4/1995 | Remes | 502/400 |
| 5,702,610 | 12/1997 | Hagen et al. | 210/682 |

FOREIGN PATENT DOCUMENTS

| | | |
|---|---|---|
| 0 552 856 A1 | 1/1993 | European Pat. Off. . |
| 0 575 612 A1 | 12/1993 | European Pat. Off. . |
| WO 94/19277 | 9/1994 | WIPO . |
| WO 97/14652 | 4/1997 | WIPO . |
| WO 97/2320 A1 | 7/1997 | WIPO . |

OTHER PUBLICATIONS

Abstract JP 63–130137.

Abstract JP 63–305297.

K. Masters, *Spray Drying Handbook*, 3rd Edition, pp. 526–531 and 556–557, copyright 1979.

K. Master, *Spray Drying Handbook*; 4th Edition, pp. 548–567, copyright 1985.

Strumillo et al., "Drying: Principles, Applications and Design", *Topics in Chemical Engineering*, pp. 352–359, copyright 1986.

Kirk–Othmer, "Drying", Encyclopedia of Chemical Technology, Fourth Edition, vol. 8, pp. 475–519, copyright 1993.

Haas, "A Review of Information of Ferrocyanide Solids for Removal of Cesium from Solutions", *Separation Science and Technology*, 28(17&18), pp. 2479–2506, 1993.

Bray et al., "Initial Evaluation of Sandia National Laboratory–Prepared Crystalline Silico–Titanates for Cesium Recovery", Battelle Memorial Institute, Pacific Northwest Laboratory, pp. 1.1–5.1, Oct. 1993.

Collins et al., "Evaluation of Selected Ion Exchangers for the Removal of Cesium and Strontium From MVST W–25 Supernate", ORNL/TM–12938, pp. 1–26, Apr. 1995.

*Primary Examiner*—Ivars Cintins
*Attorney, Agent, or Firm*—Gary L. Griswold; Robert W. Sprague; Lorraine R. Sherman

[57] ABSTRACT

A method for removing metal ions from solution comprises the steps of providing titanate particles by spray-drying a solution or slurry comprising sorbent titanates having a particle size up to 20 micrometers, optionally in the presence of polymer free of cellulose functionality as binder, said sorbent being active towards heavy metals from Periodic Table (CAS version) Groups IA, IIA, IB, IIB, IIIB, and VIII, to provide monodisperse, substantially spherical particles in a yield of at least 70 percent of theoretical yield and having a particle size distribution in the range of 1 to 500 micrometers. The particles can be used free flowing in columns or beds, or entrapped in a nonwoven, fibrous web or matrix or a cast porous membrane, to selectively remove metal ions from aqueous or organic liquid.

17 Claims, 1 Drawing Sheet

METHOD FOR REMOVING METAL IONS FROM SOLUTION WITH TITANATE SORBENTS

The invention was made with Government support under Contract AR21-96MC-33089 awarded by the Department of Energy. The Government has certain rights in the invention.

FIELD OF THE INVENTION

The present invention pertains to substantially spherical, monodisperse sorptive particles, a method therefor, and a method of using the particles in loose form, in a column, or enmeshed in a web or membrane for extraction of metal ions, particularly radioactive forms of these ions, from solution. The method and particles are particularly useful in the remediation of nuclear wastes.

BACKGROUND OF THE INVENTION

The conventional method of preparing titanate particles suffers from two significant drawbacks. First, grinding the dried solids must be done carefully so as to minimize formation of unusable fines. Second, since a wide range of particle sizes results from grinding, the particulate must be sized through sieves. These operations are time-consuming and inevitably cause loss of product. Sized titanates can then be loaded into columns in order to remove metals from radioactive waste solutions.

Spray-drying of solid materials is a method known in the art for preparation of useful solids, including titanates, pigments, and food stuffs. See, for example, Kirk-Othmer *Encyclopedia of Chemical Technology,* 4th Ed., John Wiley & Sons, New York, 1993; Vol. 8, p. 475–519, particularly pp. 505–508; C. Strumillo and T. Kudra, "Drying: Principles, Applications and Design," Gordon and Breach, New York, 1986, pp. 352–359; and Masters, K., *Spray Drying Handbook,* $4^{th}$ Ed., John Wiley & Sons, New York, 1985; pp. 548–567, particularly pp. 549, 550 and 565.

Crystalline sodium nonatitanate has been disclosed as an ion exchanger for strontium in WO 97/14652. Certain binders are stated to be useful for binding the sodium nonatitanate into larger particles. Spray-drying is not disclosed.

In U.S. Pat. Nos. 4,138,336 and 5,128,291 spray-drying of porous titania in the presence of an inorganic binder is disclosed. Crystalline silicotitanates as ion exchangers have been disclosed in WO94/19277 and in Pacific Northwest National Laboratories publication PNL-8847, UC-510 (October 1993).

SUMMARY OF THE INVENTION

Briefly, the present invention provides a method of removing metal ions from solution comprising the steps of:

providing titanate particles by spray-drying a solution or slurry comprising titanate particles, preferably having a particle size up to 20 micrometers, optionally in the presence of an organic binder free of cellulose functionality, to produce monodisperse, substantially spherical sorbent titanate particles in a yield of at least 70 percent of theoretical yield and having an average particle size in the range of 1 to 100 micrometers, said titanate sorbents being active towards metals in Periodic Table (CAS version) Groups IA, IIA, IB, IIB, IIIB, and VIII, and introducing the spray-dried titanate particles into a metal ion containing solution wherein the metal ions are as mentioned above, preferably any of Sr, Cs, Am, Pu, and U, equilibrated with the solution, and then separated from the sorbed and/or exchanged metal ions. The spray-dried particles can be in a loose form, or in agglomerated form, in a cartridge, or enmeshed in a porous membrane, matrix or web. The particles preferably are any of crystalline silicotitanate and sodium titanate particulates. Preferably, the web or matrix is porous.

The binder is preferably selected from polymers of olefins or acrylates. Preferably the sorbents are selected from the group consisting of silicotitanates and metal titanates, wherein the metal preferably is selected from Periodic Table (CAS version) Groups IA or IIA. More preferably, the sorbents are selected from the group consisting of cystalline silicotitanate (CST), and sodium titanate particles. The liquid in the solution or slurry can be aqueous or organic liquid.

In a further aspect, there are disclosed substantially spherical sorbent particles having an average particle size in the range of 1 to 100 micrometers, the particles being sorptive towards metals from Periodic Table (CAS version) Groups IA, IIA, IB, IIB, IIIB, and VIII. Preferably, the spherical particles can be crystalline silicotitanate, and sodium nonatitanate. The particles can be used in columns or beds to selectively remove heavy metal ions from Periodic Table Groups IA, IIA, IB, IIB, IIIB, and VIII, preferably any of Cs, Sr, Ag, Co, Cr, Au, Hg, U, Pu, Am, more preferably Sr, Cs, Am, Pu, and U, and other transuranic ions from aqueous solutions.

In a still further aspect, the spherical sorptive particles that have been spray-dried, optionally in the presence of olefin or acrylate polymeric binder, can be enmeshed in a nonwoven, fibrous web, matrix, or membrane. The webs or matrices or membranes, which preferably are porous, can be used in solid phase extraction (SPE) procedures to selectively remove metal ions from aqueous solutions by passing a solution of the metal ion through or by the particle loaded web, matrix, or membrane.

In yet another aspect, the invention provides an SPE device, such as a cartridge which in preferred embodiments can be pleated or spirally wound, comprising a fibrous non-woven SPE web comprising spherical, monodisperse particles which, in preferred embodiments, can be crystalline silicotitanate or sodium titanate particulate. In particular, the particulate can be enmeshed in the SPE web which preferably can comprise poly(m- or p-terephthalamide) fibers enclosed in the cartridge device. Preferably, the web is porous.

In another embodiment, the invention provides a method of removing the specified metal ions from an aqueous solution comprising passing the aqueous solution through an SPE column comprising spherical, monodisperse sorptive particles made by the method of this invention, the particles preferably being crystalline silicotitanate or sodium titanate particulate.

In this application:

"crystalline silicotitanate" can be designated CST;

"drain time" means the time required to dewater a slurry of particles and fibers when making a sheet;

"monodisperse" means a monomodal particle size distribution (i.e., particles of uniform size in a dispersed phase) about a mean in a range of 1 up to about 500 micrometers, preferably 1 to about 60 micrometers, as illustrated in FIG. 1;

"particles" and "particulate" are used interchangeably;

"size" means the diameter of a spherical particle or the largest dimension of an irregularly shaped particle;

"sodium titanate" includes "sodium nonatitanate";

"sorptive" or "sorb" means by one or both of absorption and adsorption and includes ion exchange;

"substantially spherical" means particles that are spherical, ovoid (having an elliptical cross-section), or toroidal, that are free of sharp corners; and "web", "matrix", and "membrane" are used interchangeably and each term includes the others.

The overall process yield in making particles of the invention using a spray-dryer with a diameter of at least 1 m is at least 70 percent, preferably 80–90 percent or more, compared to a yield of about 60 percent or less when using prior art ground and sieved particles. Preferably, the resulting particles are free of submicron size particles, with not more than 15 percent of particles being $<5\ \mu m$ in size. The spray-drying process substantially eliminates product particles having submicron sizes.

Additionally, free-flowing spherical particles or agglomerates thereof will pack with point contact in columns, resulting in less channeling and a lower pressure drop during extraction compared with, for example, irregularly shaped prior art particles having the same average size. Irregularly shaped prior art particles, particularly those less than 5 micrometers in size can pack tightly and lead to a high pressure drop in extraction applications. When irregularly shaped prior art particles are greater than 50 micrometers in size, channeling can result as liquids pass through, resulting in poor separations.

It has been found that compacting the spray dried particles with low pressure (as by hand pressure) and then heating to about 130° C. for 72 hours results in a sponge-like (porous) shaped article having excellent separating ability without building back-pressure.

Further, the advantages of the particles of the invention in webs, matrices, or membranes include reduced drain time by a factor of at least three compared to non-spherical, irregularly shaped, prior art particles typically obtained from a grinding process, when incorporated in a sheet article.

Further, sheet articles can be made using particles of this invention, whereas in many cases sheet articles cannot be made in a timely fashion from prior art ground and sieved particles because of excessive drain time or inability to control the sheet forming process. The sheet articles formed from spray-dried particles often have lower flow resistance than sheet articles made from ground and screened particles and are therefor more efficient in use.

DETAILED DESCRIPTION OF PREFERRED EMBODIMENTS

Figure 1:
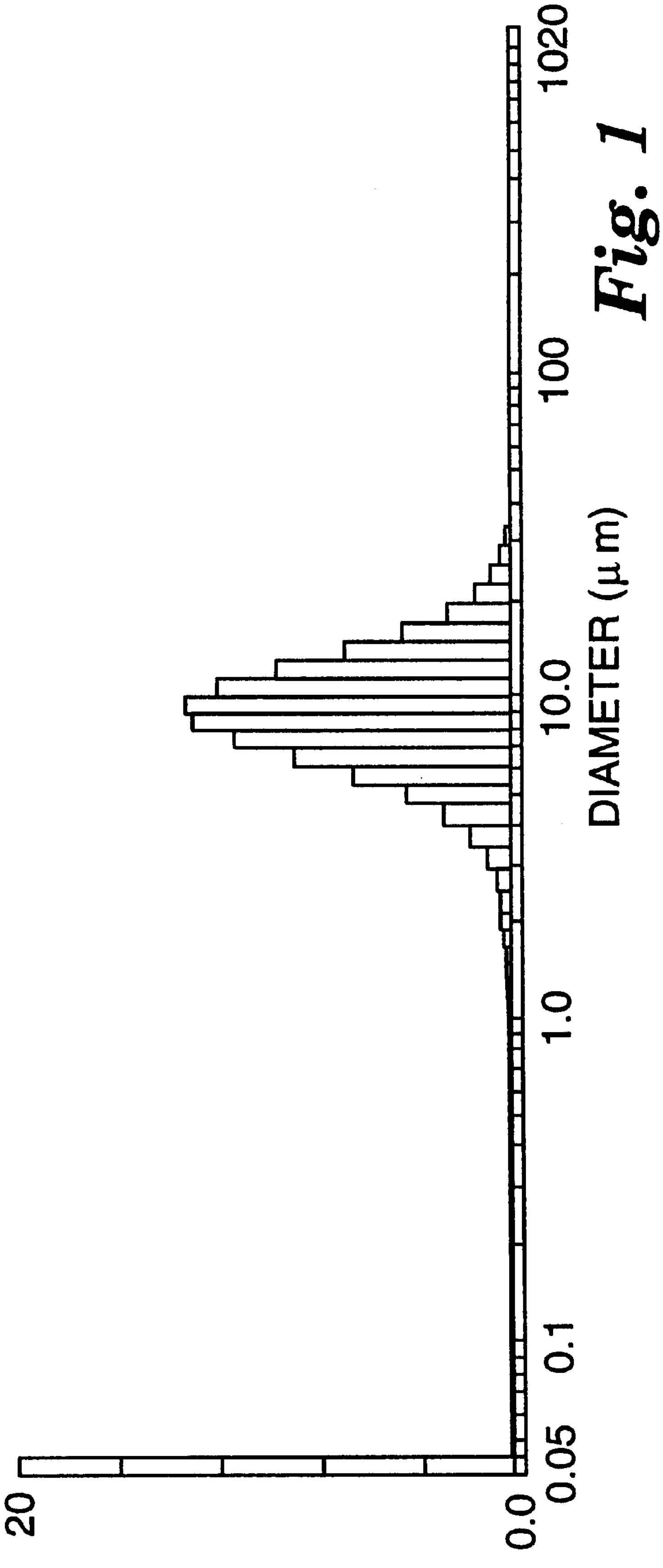
FIG. 1 is a graph of a monodisperse particle size distribution for typical spray-dried particles of the invention.

In preferred embodiments, sorptive particles useful in the present invention include substantially spherical sorptive titanate particles of crystalline silicotitanate (CST), (available from UOP, Tarrytown, N.Y.) or sodium nonatitanate (available from AlliedSignal, Inc., Morristown, N.J.). These particles can be useful to sorb metal ions, preferably strontium (Sr), cesium (Cs), americium (Am), plutonium (Pu), uranium (U), and other transuranic elements which may be in their radioactive forms.

The commercially available CST or sodium titanate, which comprise particles of irregular shapes can be slurried with liquid, preferably water, and then spray-dried, optionally in the presence of an organic binder that is free of cellulose functionality and preferably is selected from olefin or acrylate polymers, preferably using a spinning disk atomizer, and then collecting the resulting substantially spherical titanate particles having a size distribution in the range of about 1 to 500 micrometers, preferably about 1 to 100 micrometers, more preferably 1 to 60 micrometers, and most preferably 5 to 20 micrometers. Spherical particles in the size range of about 100 to 500 micrometers can be useful in industrial separations.

In the process for providing a slurry of the sorptive particles of the invention, an organic binder, wherein more preferably the binder is selected from styrene butadiene copolymer, a vinylidene halide emulsion, an acrylic (co) polymer of acrylates and/or methacrylates, and an acrylic colloidal dispersion. The binder may facilitate production of the desired particles. An organic binder such as styrene polybutadiene copolymer (e.g., Goodrite™ 1800×73, from B. F. Goodrich Company, Brecksville, Ohio) preferably can be used.

Organic binders can be present in the slurry in an amount in the range of 5–50 weight percent, preferably 15–25 weight percent of the particles present.

In some instances the slurry can be sonicated to reduce or maintain particles in a submicron size range. It is preferred that the particles in the slurry not be dried prior to subjecting them to the spray drying technique. In addition, particles in a slurry that contain a binder can also desirably be mechanically agitated and preferably also sonicated as the slurry is pumped into the spray drying unit.

Spray-drying of the slurry can be accomplished using well-known techniques which include the steps of:

1) atomization, using a spinning disk, of the material introduced into the dryer;

2) removing of moisture as, for example, by contact of the material with hot gas; and 3) separation of dry product from the exhaust drying agent.

The slurry preferably has a solids content in the range of 3 to 15 percent by weight, more preferably 5 to 10 percent by weight, most preferably 5 to 7.5 percent by weight, to ensure smooth operation of the apparatus.

After spray-drying, the particles are free-flowing with most preferred average diameters in the range of 5–20 micrometers. The particle can be evaluated for its Ion exchange capacity (see Brown, G. N., Carson, K. J., DesChane, J. R., Elovich, R. J., and P. K. Berry. September 1996. *Chemical and Radiation Stability of a Proprietary Cesium Ion Exchange Material Manufactured from WWL Membrane and Superlig*™ 644. PNNL-11328, Pacific Northwest National Laboratory, Richland, Wash.) by testing for the batch distribution coefficient or $K_d$ which is described as follows:

The batch distribution coefficient, $K_d$ is an equilibrium measure of the overall ability of the solid phase ion exchange material to remove an ion from solution under the particular experimental conditions that exist during the contact. The batch $K_d$ is an indicator of the selectivity, capacity, and affinity of an ion for the ion exchange material in the presence of a complex matrix of competing ions. In most batch $K_d$ tests, a known quantity of ion exchange material is placed in contact with a known volume of solution containing the particular ions of interest. The material is allowed to contact the solution for a sufficient time to achieve equilibrium at a constant temperature, after which the solid ion exchange material and liquid supernate are separated and analyzed.

In this application, the batch $K_d$ values were determined in one procedure by contacting 0.10 g of the particle with 20 mL of TAN matrix, for 20 hours with shaking (see formulation below).

TAN* Waste Simulant Composition

| Species | Molarity (M) |
|---|---|
| Ba | 6.39E−7 |
| Ca | 1.36E−2** |
| Cu | 1.01E−6 |
| Cr | 8.11E−4 |
| Fe | 1.16E−6 |
| Mg | 3.87E−3** |
| Na | 6.10E−6 |
| Pb | 3.13E−5 |
| Zn | 1.20E−7 |
| Sr | 3.42E−5** |

*TAN means Test Area North, INEEL Department of Energy Installation, Idaho Falls, ID

**The concentration values for Sr and Ca in the Table above are for the determination of $K_d$ values only. For breakthrough curve data the concentrations for Sr, Ca, and Mg ions were changed to 3.42E−6, 1.36E−3, and 3.87E−4, respectively, see Example 27, below. Concentrations for other ions remained constant in the solution.

In a second procedure, the batch $K_d$ values were determined by contacting 0.02 g of particle with 20 mL of liquid (Solution A) for 24 hours with shaking. Solution A comprised 0.1 M sodium hydroxide admixed with 5 M sodium nitrate containing 55 ppm Sr ion in deionized water.

The equation for determining the $K_d$ can be simplified by determining the concentration of the analyte before and after contact and calculating the quantity of analyte on the ion exchanger by difference.

$$K_d = \left(\frac{C_I - C_f}{C_f}\right)\left(\frac{V}{M * F}\right)$$

Where:

$C_I$ is the initial amount or activity of the ion of interest in the feed solution prior to contact, $C_f$ is the amount or activity after contact, V is the solution volume, M is the exchanger mass, F is the mass of dry ion exchanger divided by the mass of wet ion exchanger (F-factor).

$K_d$ (normal units are mL/g) represents the theoretical volume of solution (mL) that can be processed per mass of exchanger (dry weight basis) under equilibrium conditions.

More preferably, the experimental equipment that was required to complete the batch $K_d$ determinations included an analytical balance, a constant temperature water bath, an oven for F-factor determinations, a variable speed shaker table, 20-mL scintillation vials, 0.45 μm syringe filters, the appropriate ion exchanger, and simulant solutions. The particles were all dried thoroughly prior to testing. Approximately (0.10 g) or (0.02 g) of each material, respectively, was contacted with 20 mL of the TAN matrix or Solution A (respectively). The sample bottles were placed into a 25° C. constant temperature bath and shaken lightly for 20 hours or 24 hours, respectively. The samples were then filtered with a 0.45 micrometer syringe filter to separate the resin material from the solution and the resulting liquid was analyzed for strontium content by ICP (inductively coupled plasma).

The particles of the invention can be enmeshed in various fibrous, nonwoven webs or matrices, which perferably are porous. Types of webs or matrices include fibrillated polytetrafluoroethylene (PTFE), microfibrous webs, macrofibrous webs, and polymer pulps.

1. Fibrillated PTFE

The PTFE composite sheet material of the invention is prepared by blending the particulate or combination of particulates employed with a PTFE emulsion until a uniform dispersion is obtained and adding a volume of process lubricant up to approximately one half the volume of the blended particulate. Blending takes place along with sufficient process lubricant to exceed sorptive capacity of the particles in order to generate the desired porosity level of the resultant article. Preferred process lubricant amounts are in the range of 3 to 200 percent by weight in excess of that required to saturate the particulate, as is disclosed in U.S. Pat. No. 5,071,610, which are incorporated herein by reference. The aqueous PTFE dispersion is then blended with the particulate mixture to form a mass having a putty-like or dough-like consistency. The sorptive capacity of the solids of the mixture is noted to have been exceeded when small amounts of water can no longer be incorporated into the mass without separation. This condition should be maintained throughout the entire mixing operation. The putty-like mass is then subjected to intensive mixing at a temperature and for a time sufficient to cause initial fibrillation of the PTFE particles. Preferably, the temperature of intensive mixing is up to 90° C., preferably it is in the range of 0° to 90° C., more preferably 20° to 60° C. Minimizing the mixing at the specified temperature is essential in obtaining extraction media and chromatographic transport properties.

Mixing times will typically vary from 0.2 to 2 minutes to obtain the necessary initial fibrillation of the PTFE particles. Initial mixing causes partial disoriented fibrillation of a substantial portion of the PTFE particles.

Initial fibrillation generally will be noted to be at an optimum within 60 seconds after the point when all components have been fully incorporated into a putty-like (dough-like) consistency. Mixing beyond this point will produce a composite sheet of inferior extraction medium and chromatographic properties.

Devices employed for obtaining the necessary intensive mixing are commercially available intensive mixing devices which are sometimes referred to as internal mixers, kneading mixers, double-blade batch mixers as well as intensive mixers and twin screw compounding mixers. The most popular mixer of this type is the sigma-blade or sigma-arm mixer. Some commercially available mixers of this type are those sold under the common designations Banbury mixer, Mogul mixer, C. W. Brabender Prep mixer and C. W. Brabender sigma blade mixer. Other suitable intensive mixing devices may also be used.

The soft putty-like mass is then transferred to a calendering device where the mass is calendered between gaps in calendering rolls preferably maintained at a temperature up to 125° C., preferably in the range of 0° to about 100° C., more preferably in the range of 20° C. to 60° C., to cause additional fibrillation of the PTFE particles of the mass, and consolidation while maintaining the water level of the mass at least at a level of near the sorptive capacity of the solids, until sufficient fibrillation occurs to produce the desired extraction medium. Preferably the calendering rolls are made of a rigid material such as steel. A useful calendering device has a pair of rotatable opposed calendering rolls each of which may be heated and one of which may be adjusted toward the other to reduce the gap or nip between the two. Typically, the gap is adjusted to a setting of 10 millimeters for the initial pass of the mass and, as calendering operations progress, the gap is reduced until adequate consolidation occurs. At the end of the initial calendering operation, the resultant sheet is folded and then rotated 90° to obtain biaxial fibrillation of the PTFE particles. Smaller rotational angles (e.g., 20° to less than 90°) may be preferred in some extraction and chromatographic applications to reduce calender biasing, i.e., unidirectional fibrillation and orientation. Excessive calendering (generally more than two times) reduces the porosity which in turn reduces the solvent wicking in thin layer chromatography (TLC) and the flow-through rate in the filtration mode.

During calendering, the lubricant level of the mass is maintained at least at a level of exceeding the absorptive capacity of the solids by at least 3 percent by weight, until sufficient fibrillation occurs and to produce porosity or void volume of at least 30 percent and preferably 40 to 70 percent of total volume. The preferred amount of lubricant is determined by measuring the pore size of the article using a Coulter Porometer as described in the Examples below. Increased lubricant results in increased pore size and increased total pore volume as is disclosed in U.S. Pat. No. 5,071,610, the process of which is incorporated herein by reference.

The calendered sheet is then dried under conditions which promote rapid drying yet will not cause damage to the composite sheet or any constituent therein. Preferably drying is carried out at a temperature below 200° C. The preferred means of drying is by use of a forced air oven. The preferred drying temperature range is from 20° C. to about 70° C. The most convenient drying method involves suspending the composite sheet at room temperature for at least 24 hours. The time for drying may vary depending upon the particular composition, some particulate materials having a tendency to retain water more than others.

The resultant composite sheet preferably has a tensile strength when measured by a suitable tensile testing device such as an Instron (Canton, Mass.) tensile testing device of at least 0.5 MPa. The resulting composite sheet has uniform porosity and a void volume of at least 30 percent of total volume.

The PTFE aqueous dispersion employed in producing the PTFE composite sheet of the invention is a milky-white aqueous suspension of minute PTFE particles. Typically, the PTFE aqueous dispersion will contain about 30 percent to about 70 percent by weight solids, the major portion of such solids being PTFE particles having a particle size in the range of about 0.05 to about 0.5 micrometers. The commercially available PTFE aqueous dispersion may contain other ingredients, for example, surfactant materials and stabilizers which promote continued suspension of the PTFE particles.

Such PTFE aqueous dispersions are presently commercially available from Dupont de Nemours Chemical Corp., for example, under the trade names Teflon™ 30, Teflon™ 30B or Teflon™ 42. Teflon™ 30 and Teflon™ 30B contain about 59 percent to about 61 percent solids by weight which are for the most part 0.05 to 0.5 micrometer PTFE particles and from about 5.5 percent to about 6.5 percent by weight (based on weight of PTFE resin) of non-ionic wetting agent, typically octylphenol polyoxyethylene or nonylphenol polyoxyethylene. Teflon™ 42 contains about 32 to 35 percent by weight solids and no wetting agent but has a surface layer of organic solvent to prevent evaporation. A preferred source of PTFE is FLUON™, available from ICI Americas, Inc. Wilmington, Del. It is generally desirable to remove, by organic solvent extraction, any residual surfactant or wetting agent after formation of the article.

In other embodiments of the present invention, the fibrous membrane (web) can comprise non-woven, macro- or microfibers preferably selected from the group of fibers consisting of polyamide, polyolefin, polyester, polyurethane, glass fiber, polyvinylhalide, or a combination thereof. The fibers preferably are polymeric. (If a combination of polymers is used, a bicomponent fiber may be obtained.) If polyvinylhalide is used, it preferably comprises fluorine of at most 75 percent (by weight) and more preferably of at most 65 percent (by weight). Addition of a surfactant to such webs may be desirable to increase the wettability of the component fibers.

2. Macrofibers

The web can comprise thermoplastic, melt-extruded, large-diameter fibers which have been mechanically-calendered, air-laid, or spunbonded. These fibers have average diameters in the general range of 50 μm to 1,000 μm.

Such non-woven webs with large-diameter fibers can be prepared by a spunbond process which is well known in the art. (See, e.g., U.S. Pat. Nos. 3,338,992, 3,509,009, and 3,528,129, the fiber preparation processes of which are incorporated herein by reference.) As described in these references, a post-fiber spinning web-consolidation step (i.e., calendering) is required to produce a self-supporting web. Spunbonded webs are commercially available from, for example, AMOCO, Inc. (Napierville, Ill.).

Non-woven webs made from large-diameter staple fibers can also be formed on carding or air-laid machines (such as a Rando-Webber™ Model 12BS made by Curlator Corp., East Rochester, N.Y.), as is well known in the art. See, e.g., U.S. Pat. Nos. 4,437,271, 4,893,439, 5,030,496, and 5,082,720, the processes of which are incorporated herein by reference.

A binder is normally used to produce self-supporting webs prepared by the air-laying and carding processes and is optional where the spunbond process is used. Such binders can take the form of resin systems which are applied after web formation or of binder fibers which are incorporated into the web during the air laying process.

Examples of common binder fibers include adhesive-only type fibers such as Kodel™ 43UD (Eastman Chemical Products, Kingsport, Tenn.) and bicomponent fibers, which are available in either side-by-side form (e.g., Chisso ES Fibers, Chisso Corp., Osaka, Japan) or sheath-core form (e.g., Melty™ Fiber Type 4080, Unitika Ltd., Osaka, Japan). Application of heat and/or radiation to the web "cures" either type of binder system and consolidates the web.

Generally speaking, non-woven webs comprising macrofibers have relatively large voids. Therefore, such webs have low capture efficiency of small-diameter particulate (reactive supports) which is introduced into the web. Nevertheless, particulate can be incorporated into the non-woven webs by at least four means. First, where relatively large particulate is to be used, it can be added directly to the web, which is then calendered to actually enmesh the particulate in the web (much like the PTFE webs described previously). Second, particulate can be incorporated into the primary binder system (discussed above) which is applied to the non-woven web. Curing of this binder adhesively attaches the particulate to the web. Third, a secondary binder system can be introduced into the web. Once the particulate is added to the web, the secondary binder is cured (independent of the primary system) to adhesively incorporate the particulate into the web. Fourth, where a binder fiber has been introduced into the web during the air laying or carding process, such a fiber can be heated above its softening temperature. This adhesively captures particulate which is introduced into the web. Of these methods involving non-PTFE macrofibers, those using a binder system are generally the most effective in capturing particulate. Adhesive levels which will promote point contact adhesion are preferred.

Once the particulate (reactive supports) has been added, the loaded webs are typically further consolidated by, for example, a calendering process. This further enmeshes the particulate within the web structure.

Webs comprising larger diameter fibers (i.e., fibers which average diameters between 50 μm and 1,000 μm) have relatively high flow rates because they have a relatively large mean void size.

3. Microfibers

When the fibrous web comprises non-woven microfibers, those microfibers provide thermoplastic, melt-blown polymeric materials having active particulate dispersed therein. Preferred polymeric materials include such polyolefins as polypropylene and polyethylene, preferably further comprising a surfactant, as described in, for example, U.S. Pat. No. 4,933,229, the process of which is incorporated herein by reference. Alternatively, surfactant can be applied to a blown microfibrous (BMF) web subsequent to web formation. Polyamide can also be used. Particulate can be incorporated into BMF webs as described in U.S. Pat. No. 3,971,373, the process of which is incorporated herein by reference.

Microfibrous webs of the present invention have average fiber diameters up to 50 μm, preferably from 2 μm to 25 μm, and most preferably from 3 μm to 10 μm. Because the void sizes in such webs range from 0.1 μm to 10 μm, preferably from 0.5 μm to 5 μm, flow through these webs is not as great as is flow through the macrofibrous webs described above.

4. Cast Porous Membranes

Solution-cast porous membranes can be provided by methods known in the art. Such polymeric porous membranes can be, for example, polyolefin including polypropylene, polyamide, polyester, polyvinyl chloride, and polyvinyl acetate fibers.

5. Fibrous Pulps

The present invention also provides a solid phase extraction sheet comprising a porous fibrous pulp, preferably a polymeric pulp, comprising a plurality of fibers that mechanically entrap active particles, and preferably a polymeric hydrocarbon binder, the weight ratio of particles to binder being at least 13:1 and the ratio of average uncalendered sheet thickness to effective average particle diameter being at least 125:1.

Generally, the fibers that make up the porous polymeric pulp of the SPE sheet of the present invention can be any pulpable fiber (i.e., any fiber that can be made into a porous pulp). Preferred fibers are those that are stable to radiation and/or to a variety of pHs, especially very high pHs (e.g., pH=14) and very low pHs (e.g., pH=1). Examples include polyamide fibers and those polyolefin fibers that can be formed into a pulp including, but not limited to, polyethylene and polypropylene. Particularly preferred fibers are aromatic polyamide fibers and aramid fibers because of their stability to both radiation and highly caustic fluids. Examples of useful aromatic polyamide fibers are those fibers of the nylon family. Polyacrylic nitrile, cellulose, and glass can also be used. Combinations of pulps can be used.

Examples of useful aramid fibers are those fibers sold under the trade name Kevlar™ (DuPont, Wilmington, Del.). Kevlar™ fiber pulps are commercially available in three grades based on the length of the fibers that make up the pulp. Regardless of the type of fiber(s) chosen to make up the pulp, the relative amount of fiber in the resulting SPE sheet (when dried) ranges from about 12.5 percent to about 30 percent (by weight), preferably from about 15 percent to 25 percent (by weight).

Useful binders in the SPE sheet of the present invention are those materials that are stable over a range of pHs (especially high pHs) and that exhibit little or no interaction (i.e., chemical reaction) with either the fibers of the pulp or the particles entrapped therein. Polymeric hydrocarbon materials, originally in the form of latexes, have been found to be especially useful. Common examples of useful binders include, but are not limited to, natural rubbers, neoprene, styrene-butadiene copolymer, acrylate resins, and polyvinyl acetate. Preferred binders include neoprene and styrene-butadiene copolymers. Regardless of the type of binder used, the relative amount of binder in the resulting SPE sheet (when dried) is about 3 percent to about 7 percent, preferably about 5 percent. The preferred amount has been found to provide sheets with nearly the same physical integrity as sheets that include about 7 percent binder while allowing for as great a particle loading as possible. It may be desirable to add a surfactant to the fibrous pulp, preferably in small amounts up to about 0.25 weight percent of the composite.

In some cases the binder present in or on the particles from the spray-drying process was sufficient and no additional binder was necessary to make the SPE sheet.

Because the capacity and efficiency of the SPE sheet depends on the amount of particles included therein, high particle loading is desirable. The relative amount of particles in a given SPE sheet of the present invention is preferably at least about 65 percent (by weight), more preferably at least about 70 percent (by weight), and most preferably at least about 75 percent (by weight). Additionally, the weight percentage of particles in the resulting SPE sheet is at least 13 times greater than the weight percentage of binder, preferably at least 14 times greater than the weight percentage of binder, more preferably at least 15 times greater than the weight percentage of binder.

Regardless of the type or amount of the particles used in the SPE sheet of the present invention, they are mechanically entrapped or entangled in the fibers of the porous pulp. In other words, the particles are not covalently bonded to the fibers.

Objects and advantages of this invention are further illustrated by the following examples. The particular materials and amounts thereof, as well as other conditions and details, recited in these examples should not be used to unduly limit this invention.

EXAMPLES

Example 1

Crystalline Silicotitanate (CST) Bound with a Styrene Butadiene Emulsion (Goodrite™ 1800×73)

The material was prepared as follows: 0.80 g nonionic surfactant (Tergitol™ TMN-06, Union Carbide Corp., Danbury, Conn.) was dispersed in 2743 g deionized water with an air mixer. To this was then added 1282.8 g of ground crystalline silicotitanate (IONSIV IE 910™, UOP, Tarrytown, N.J.) (150 g, 11.7% solids) with agitation. Slowly to this was added 150.9 g of a styrene butadiene emulsion (Goodrite™ 1800×73 B. F. Goodrich, Brecksville, Ohio) (39% solids, 58.5 g) with stirring. This mixture was mixed for 1 hour with an air mixer. This slurry was then sonicated using a Branson Sonifier E Module™ ultrasonic generator Model EMW50-16 with sonication module Model WF-316 (Branson Ultrasonics Corporation, Danbury, Conn.) with a flow through rate of 175 mL/min. The material was then fed into the spray drier (Niro Atomizer, Serial number #2402, Model 68, Order No. 093-1413-00, Niro Atomizer, Inc., Columbia, Md.) at 35 mL/min. Spray drying conditions were as follows:

Inlet air temperature: 196° C.

Outlet Temperature: 74.5° C.

Slurry feed rate: 35 mL/min, 2.1 L/hour

Spinning disc air motor pressure: 400 KPa, (58 psig)

Cyclone Magnahelic pressure: 0.47 in $H_2O$ ($1.19\times10^{-3}$ kg/cm$^2$)

After spray drying the particle was dried in a vacuum oven for 24 hours at 130° C. and 709 Torr (28 inches Mercury vacuum) to remove all moisture. Recovered dried CST/Goodrite 1800×73 was observed under a scanning electron microscope (Cambridge model S240, LEO Electromicroscopy Inc., Thornwood, N.Y.,) to be mostly spherical in shape with some large agglomerates formed. Measurement of the particles using a Horiba Model LA-900 particle size analyzer (Horiba Instruments, Inc., Irvine, Calif.), showed the average particle size of approximately 29.78 micrometers with 0 percent of the particles less than 5 micrometers. The yield of bound CST was 72 percent.

Example 2

CST Bound with Styrene Butadiene Emulsion (Goodrite 1800×73)

The material was prepared by dispersing 0.80 g Tergitol TMN-06 in 1481 g deionized water with an air mixer. To this was then added 1159 g of ground crystalline silicotitanate (150 g, 13.0% solids) (IONSIV IE 910) with agitation. Slowly to this was added 150.1 g Goodrite 1800×73 (39% solids, 58.5 g) with stirring. This mixture was mixed for 1 hour with an air mixer. The slurry was spray dried using a Niro Atomizer, (Serial number #2402) at 35 mL/min. Spray drying conditions were as follows:

Inlet air temperature: 197° C.

Outlet Temperature: 81.1° C.

Slurry feed rate: 35 mL/min, 2.1 L/hour

Spinning disc air motor pressure: 400 KPa, (58 psig)

Cyclone Magnahelic pressure: 0.47 in $H_2O$ ($1.19\times10^{-3}$ kg/cm$^2$)

After spray drying the particle was dried in a vacuum oven for 24 hours at 130° C. and 709 Torr to remove all moisture. Recovered dried CST/Goodrite 1800×73 was observed under a scanning electron microscope (Cambridge model S240) to be spherical in shape with some large agglomerates formed. Measurement of the particles using a Horiba Model LA-900 particle size analyzer showed the average particle size of approximately 86.8 micrometers with 4.3 percent of the particles less than 5 micrometers. The yield of bound CST was 79 percent.

Example 3

CST

The material, 317 g crystalline silicotitanate powder (Ionsiv IE 910), was ground with 600 mL deionized water in a ball mill using zirconia media for 4 hours it was then reduced to 5% solids with 5740 mL deionized water. This mixture was mixed for 1 hour with a air mixer. The slurry was spray dried using a Niro Atomizer, (Serial number #2402) at 35 mL/min. Spray drying conditions were as follows:

Inlet air temperature: 200° C.

Outlet Temperature: 67.1° C.

Slurry feed rate: 35 mL/min, 2.1 L/hour

Spinning disc air motor pressure: 400 KPa, (58 psig)

Cyclone Magnahelic pressure: 0.47 in $H_2O$ ($1.19\times10^{-3}$ kg/cm$^2$)

After spray drying the particle was dried in a vacuum oven for 24 hours at 130° C. and 709 Torr to remove all moisture. Measurement of the particles using a Horiba Model LA-900 particle size analyzer showed the average particle size of approximately 15 micrometers with 5.5 percent of the particles less than 5 micrometers. The yield of CST was 93 percent.

Example 4

CST (Comparative)

Crystalline silicotitanate (Ionsiv IE 910, UOP, Tarrytown, N.J.) as received from the supplier had an average particle size (as determined using a Horiba LA-900 particle size analyzer) of 0.394 micrometers with 81% of the particle less than 5 micrometers. The particles as examined by scanning electron microscope (SEM) were predominately irregular in shape and consisted of particles and agglomerates.

Example 5

Sodium Titanate Bound with Styrene Butadiene Emulsion (Goodrite 1800×73)

This particle was prepared by dispersing 0.80 g Tergitol TMN-06 in 2743 g deionized water with an air mixer. To this was then added 1468.9 g of sodium nonatitanate (AlliedSignal, Morristown, N.J.) (150 g, 9.9% solids) with agitation. Slowly to this was added 150.1 g Goodrite 1800×73 (39% solids, 58.5 g) with stirring. This mixture was mixed for 1 hour with a air mixer. This slurry was then sonicated using a Branson Sonifier with a flow through rate of 175 mL/min. The material was then fed into the spray drier (Niro Atomizer, Serial number #2402) at 40 mL/min. Spray drying conditions were as follows:

Inlet air temperature: 196° C.

Outlet Temperature: 68.5° C.

Slurry feed rate: 40 mL/min, 2.4 L/hour

Spinning disc air motor pressure: 380 KPa, (55.1 psig)

Cyclone Magnahelic pressure: 0.47 in $H_2O$ ($1.19\times10^{-3}$ kg/cm$^2$)

After spray drying the particle was dried in a vacuum oven for 24 hours at 130° C. and 709 Torr to remove all moisture. Recovered dried sodium titanate/Goodrite 1800×73 was observed under a scanning electron microscope (Cambridge model S240) to be spherical in shape with some agglomerates formed. Measurement of the particles using a Horiba Model LA-900 particle size analyzer, showed the average particle size of approximately 41.2 micrometers with 14 percent of the particles less than 5 micrometers. The yield of bound sodium titanate was 84 percent.

Example 6

Sodium Titanate

A slurry of sodium nonatitanate purchased from AlliedSignal was mixed for 12 hour with a low shear air mixer. The material was then fed into the spray drier (Niro Atomizer, Serial number #2402) at 40 mL/min. Spray drying conditions were as follows:

Inlet air temperature: 200° C.

Outlet Temperature: 73.5° C.

Slurry feed rate: 40 mL/min, 2.4 L/hour

Spinning disc air motor pressure: 400 KPa, (58 psig)

Cyclone Magnahelic pressure: 0.47 in $H_2O$ ($1.19\times10^{-3}$ kg/cm$^2$)

After spray drying the particle was dried in a vacuum oven for 24 hours at 130° C. and 709 Torr to remove all moisture. Recovered dried sodium nonatitanate was observed under a scanning electron microscope (Cambridge model S240) to be spherical in shape. Measurement of the particles using a Horiba Model LA-900 particle size analyzer, showed the average particle size of approximately 11.8 micrometers with 8 percent of the particles less than 5 micrometers. The yield of sodium titanate was 91 percent.

Example 7

Sodium Titanate (Comparative)

Sodium nonatitanate (AlliedSignal, Morristown, N.J.) as received from the supplier had an average particle size (as determined using a Horiba LA-900 particle size analyzer) of 3.0 micrometers with 70% of the particle less than 5 micrometers in largest diameter. The particles as examined by scanning electron microscope were predominately irregular in shape with particles and agglomerates.

Example 8

Sodium Titanate Bound with a Heat Reactive Acrylic Copolymer Latex (Hycar™ 26138)

The particle was prepared by adding 1.21 g Tergitol TMN-06 into 2985 g sodium nonatitanate slurry (200 g, 6.7% solution) with an air mixer. Slowly to this was added 156 g Hycar 26138 (B. F. Goodrich, Cleveland, Ohio) a heat reactive acrylic copolymer latex (78 g, 50% solids) with stirring. This mixture was mixed until it was spray dried. The slurry was spray dried using a Niro Atomizer, (Serial number #2402) at 45 mL/min. Spray drying conditions were as follows:

Inlet air temperature: 200° C.

Outlet Temperature: 72.6° C.

Slurry feed rate: 45 mL/min, 2.7 L/hour

Spinning disc air motor pressure: 380 KPa, (55 psig)

Cyclone Magnahelic pressure: 0.43 in $H_2O$ ($1.09\times10^{-3}$ kg/cm$^2$)

After spray drying the particle was dried in a vacuum oven for 24 hours at 130° C. and 709 Torr to remove all moisture. Recovered dried sodium nonatitanate/Hycar 26138 was observed under a scanning electron microscope (Cambridge model S240) to be textured spheres which are mostly agglomerated together and some bonding between the particles. Measurement of the particles using a Horiba Model LA-900 particle size analyzer, showed the average particle size of approximately 38.7 micrometers with 0.5 percent of the particles less than 5 mircrometers. The yield of bound sodium titanate was 72 percent.

Example 9

Sodium Titanate Bound with a Vinylidene Chloride Emulsion (Permax™ 801)

The particle was prepared by adding 1.4 g Tergitol TMN-06 into 2985 g sodium nonatitanate slurry (200 g, 6.7% solution) with an air mixer. Slowly to this was added 135 g Permax 801 (B. F. Goodrich, Cleveland, Ohio) a vinylidene chloride emulsion (78 g, 57.5% solids) with stirring. This mixture was mixed until it was spray dried. The slurry was spray dried using a Niro Atomizer (Serial number #2402) at 45 mL/min. Spray drying conditions were as follows:

Inlet air temperature: 200° C.

Outlet Temperature: 72.2° C.

Spinning disc air motor pressure: 400 KPa, (58 psig)

Cyclone Magnahelic pressure: 0.47 in $H_2O$ ($1.19\times10^{-3}$ kg/cm$^2$)

After spray drying the particle was dried in a vacuum oven for 24 hours at 130° C. and 709 Torr to remove all moisture. Recovered dried sodium titanate/Permax 801 was observed under a scanning electron microscope (Cambridge model S240) to be agglomerates of smooth spheres with some particles bonded together. Measurement of the particles using a Horiba Model LA-900 particle size analyzer showed an average particle size of approximately 48.3 micrometers with 0 percent of the particles less than 5 micrometers. The yield of bound sodium titanate was 72 percent.

Example 10

Sodium Titanate Bound with a Waterborne Acrylic Resin (Maincote™ HG-54D

The particle was prepared by adding 1.2 g Tergitol TMN-06 into 3333 g sodium nonatitanate slurry (223 g, 6.7% solution) with an air mixer. Slowly to this was added 190.24 g Maincote HG-54D (Rohm and Haas, Philadelphia, Pa.) a waterborne acrylic resin (78 g, 41% solids) with stirring. This mixture was mixed until it was spray dried. The slurry was spray dried using a Niro Atomizer, (Serial number #2402) at 45 mL/min. Spray drying conditions were as follows:

Inlet air temperature: 200° C.

Outlet Temperature: 71.5° C.

Slurry feed rate: 45 mL/min, 2.7 L/hour

Spinning disc air motor pressure: 390 KPa, (57 psig)

Cyclone Magnahelic pressure: 0.47 in $H_2O$ ($1.19\times10^{-3}$ kg/cm$^2$)

After spray drying the particle was dried in a vacuum oven for 24 hours at 130° C. and 709 Torr to remove all moisture. Recovered dried sodium nonatitanate/Maincote HG-54D was observed under a scanning electron microscope (Cambridge model S240) to be textured spheres with some agglomeration with little bonding between the spheres. Measurement of the particles using a Horiba Model LA-900 particle size analyzer showed an average particle size of approximately 36.7 micrometers with 0 percent of the particles less than 5 micrometers. The yield of bound sodium titanate was 85 percent.

Example 11

Sodium Titanate Bound with an Acrylic Emulsion (Rhoplex™ Multilobe™ 200)

The particle was prepared by adding 1.2 g Tergitol TMN-06 into 3333 g sodium nonatitanate slurry (224 g, 6.7% solution) with an air mixer. Slowly to this was added 145.8 g Rhoplex Multilobe 200 (Rohm and Haas, Philadelphia, Pa.) an acrylic emulsion (78 g, 53.5% solids) with stirring. This mixture was mixed until it was spray dried. The slurry was spray dried using a Niro Atomizer, (Serial number #2402) at 45 mL/min. Spray drying conditions were as follows:

Inlet air temperature: 200° C.

Outlet Temperature: 75.1° C.

Slurry feed rate: 45 mL/min, 2.7 L/hour

Spinning disc air motor pressure: 390 KPa, (57 psig)

Cyclone Magnahelic pressure: 0.43 in $H_2O$ ($1.09\times10^{-3}$ kg/cm$^2$)

After spray drying the particle was dried in a vacuum oven for 24 hours at 130° C. and 709 Torr to remove all moisture. Recovered dried sodium titanate/Rhoplex Multilobe 200 was observed under a scanning electron microscope (Cambridge model S240) to be textured spheres that are mostly agglomerated together with bonding between the spheres. Measurement of the particles using a Horiba Model LA-900 particle size analyzer showed an average particle size of approximately 34.3 micrometers with 1 percent of the particles less than 5 micrometers. The yield of bound sodium titanate was 81 percent.

Example 12

Sodium Titanate Bound with Styrene Butadiene Emulsion (Goodrite 1800×73)

The particle was prepared by adding 1.92 g Tergitol TMN-06 into 6312 g sodium titanate slurry (278 g, 4.4% solution) with an air mixer. Slowly to this was added 278.5 g Goodrite 1800×73 a styrene butadiene emulsion (108.7 g, 39% solids) with stirring. This mixture was mixed until it was spray dried. The slurry was spray dried using a Niro Atomizer, (Serial number #2402) at 45 mL/min. Spray drying conditions were as follows:

Inlet air temperature: 200° C.

Outlet Temperature: 71.0° C.

Slurry feed rate: 45 mL/min, 2.7 L/hour

Spinning disc air motor pressure: 390 KPa, (57 psig)

Cyclone Magnahelic pressure: 0.47 in $H_2O$ ($1.19\times10^{-3}$ kg/cm$^2$)

After spray drying the particle was dried in a vacuum oven for 24 hours at 130° C. and 709 Torr to remove all moisture. Recovered dried sodium nonatitanate/Goodrite 1800×73 was observed under a scanning electron microscope (Cambridge model S240) to be spherical in shape with some agglomerates formed. Measurement of the particles using a Horiba Model LA-900 particle size analyzer, showed the average particle size of approximately 27.3 micrometers with 1.3 percent of the particles less than 5 micrometers. The yield of bound sodium titanate was 90 percent.

Example 13

(Comparative)

A particle filled porous web was prepared from the CST particles (unprocessed particles), as described in Example 4. Into a 4 L Waring™ Blendor™ was added 2000 ml of hot water, 0.25 g Tamol 850™ nonionic dispersant (Rohm and Haas Co, Philadelphia, Pa.); this was mixed for 30 seconds on low speed. Into the Blendor was then added 14.35 g of Kevlar™ 1F306 aramid pulp (83.5% solids, 12 g dry weight Dupont, Wilmington, Del.) and again this was mixed for 30 seconds. To this mixture was then added 169.2 g CST particles from Example 4 (26.6% solids, 45 g dry weight) and again mixed for 30 seconds. Next, 7.69 g Goodrite 1800×73 was added (39% solids, 3 g dry weight), and again mixed for 30 seconds. Then 20 g of 25% alum (aluminum sulfate in water) was added with mixing on low for an additional minute, to this was then added 1.2 g of an acrylamide modified cationic copolymer (1% Solution of Nalco™ 7530, Nalco Chemical Co, Chicago, Ill.) with mixing continuing for 4 seconds. The mixture was then poured into a Williams sheet mold (Williams Apparatus Co, Watertown, N.Y.) equipped with a 413 cm$^2$ porous screen having pores size 0.171 mm (80 mesh) at the bottom and allowed to drain, drain time was 135 seconds. The resulting wet sheet was pressed in a pneumatic press (Air Hydraulics Inc., Jackson, Mich.) at approximately 551 KPa for 5 minutes to remove additional water. Finally the porous web was dried on a Williams handsheet dryer (Williams Apparatus Co, Watertown, N.Y.) for 90 minutes at 100° C. Tensile strength was determined using a Thwing Albert Model QCII-XS electronic tensile tester (Thwing Albert Instrument Company, Philadelphia, Pa.) equipped with a 227 Kg load cell at 10% load range. The tensile strength was determined to be 6130 KPa with 133% elongation without break.

Example 14

A particle filled porous web was prepared as described in Example 13 using CST/Goodrite 1800×73 particles from Example 1. The drain time was 40 seconds. The tensile strength was determined with the Thwing Albert model QCII-XS electronic tensile tester to be 797 psig (5495 KPa) with 134% elongation without break.

Example 15

A particle filled porous web was prepared as described in Example 13 using CST particles from Example 2. The drain time was 135 seconds. The tensile strength was determined with the Thwing Albert model QCII-XS electronic tensile tester to be 697 psig (4805 KPa) with 95% elongation without break. Preferably, the CST particles are combined with a binder (see Example 14) to optimize the drain time of the web.

Example 16

A particle filled porous web was prepared from the CST/Goodrite 1800×73 particles from Example 2. Into a 4 L Waring™ Blendor™ was added 2000 ml of hot water and 0.25 g Tamol 850™ which was mixed for 30 seconds on low. Into the Waring Blendor was then added 14.35 g of Kevlar 1F306 aramid pulp (83.5% solids, 12 g dry weight) and again this was mixed for 30 seconds. To this mixture was then added 45 g CST/Goodrite 1800×73 particles from Example 2 (100% solids) and again mixed for 30 seconds. No additional binder, other than that in or on the particles, was used. The mixture was then poured into a Williams sheet mold equipped with a 413 cm$^2$ porous screen having pores size 0.171 mm (80 mesh) at the bottom and allowed to drain, drain time was 25 seconds. The resulting wet sheet was pressed in an Air Hydraulics pneumatic press at approximately 551 KPa for 5 minutes to remove additional water. Finally the porous web was dried on a Williams handsheet dryer for 90 minutes at 100° C. The strength tensile was determined with the Thwing Albert model QCII-XS electronic tensile tester to be 129 psig (889 KPa).

Example 17

(Comparative)

A particle filled porous web was prepared as described in Example 13 from the sodium titanate particles described in Example 7. The drain time was 720 seconds. The tensile strength was determined with the Thwing Albert model QCII-XS electronic tensile tester to be 1283 psig (8845 KPa) with 159% elongation without break.

Example 18

A particle filled porous web was prepared as described in Example 13 from the sodium titanate particles described in Example 6. The drain time was 20 seconds. The tensile strength was determined with the Thwing Albert model QCII-XS electronic tensile tester to be 110 psig (758 KPa).

Example 19

A particle filled porous web was prepared as described in Example 13 from the sodium titanate/Goodrite 1800×73 particles described in Example 5. The drain time was 35 seconds. The tensile was determined with the Thwing Albert model QCII-XS electronic tensile tester to be 910 psig (6247 KPa) with 136% elongation without break.

Example 20

A particle filled porous web was prepared using the sodium titanate/Goodrite 1800×73 particles described in Example 5. Into a 4 L Waring Blendor was added 2000 ml of hot water and 0.25 g Tamol 850™ which was mixed for 30 seconds on low. Into the Blendor was then added 14.35 g of Kevlar 1F306 aramid pulp (83.5% solids, 12 g dry weight) and again this was mixed for 30 seconds. To this mixture was then added 45 g sodium titanate/Goodrite 1800×73 particle (100% solids) and again mixed for 30 seconds. No additional binder, other than that in or on the particles, was used. The mixture was then poured into a Williams sheet mold equipped with a 413 $cm^2$ porous screen having pores size 0.171 mm (80 mesh) at the bottom and allowed to drain, drain time was 15 seconds. The resulting wet sheet was pressed in an Air Hydraulics pneumatic press at approximately 551 KPa for 5 minutes to remove additional water. Finally the porous web was dried on a Williams handsheet dryer for 90 minutes at 100° C. The tensile strength was determined with the Thwing Albert model QCII-XS electronic tensile tester to be 59 psig (406 KPa).

Example 21

A particle filled porous web was prepared using the sodium titanate/Goodrite 1800×73 particles described in Example 5. Into a 4 L Waring™ Blendor was added 2000 ml of hot water and 0.25 g Tamol 850™ which was mixed for 30 seconds on low. Into the Blendor was then added 14.35 g of Kevlar 1F306 aramid pulp (83.5% solids, 12 g dry weight) and again this was mixed for 30 seconds. To this mixture was then added 45 g sodium titanate/Goodrite 1800×73 particle (100% solids) and again mixed for 60 seconds. No additional binder, other than that in or on the particles, was used. To this was then added 20 g of 25% alum (aluminum sulfate in water useful as a coelescing) and mixed for 30 seconds. The mixture was then poured into a Williams sheet mold equipped with a 413 $cm^2$ porous screen having pores size 0.171 mm (80 mesh) at the bottom and allowed to drain, drain time was 40 seconds. The resulting wet sheet was pressed in an Air Hydraulics pneumatic press at approximately 551 KPa for 5 minutes to remove additional water. Finally the porous web was dried on a Williams handsheet dryer for 90 minutes at 100° C. The tensile strength was determined with the Thwing Albert model QCII-XS electronic tensile tester to be 220 psig (1516 KPa) with 153% elongation without break.

Example 22

A particle filled porous web was prepared as described in Example 13 from the sodium titanate/Hycar 26138 particles described in Example 8. The drain time was 180 seconds. The tensile strength was determined with the Thwing Albert model QCII-XS electronic tensile tester to be 592 psig (4081 KPa) with 98% elongation without break.

Example 23

A particle filled porous web was prepared as described in Example 13 from the sodium titanate/Permax 801 particles described in Example 9. The drain time was 40 seconds. The tensile strength was determined with the Thwing Albert model QCII-XS electronic tensile tester to be 504 psig (3475 KPa) with 103% elongation without break.

Example 24

A particle filled porous web was prepared as described in Example 13 from the sodium titanate/Maincote HG-54D particles described in Example 10. The drain time was 180 seconds. The tensile strength was determined with the Thwing Albert model QCII-XS electronic tensile tester to be 797 psig (5500 KPa) with 83% elongation without break.

Example 25

A particle filled porous web was prepared as described in Example 13 from the sodium titanate/Rhoplex Multilobe 200 particles described in Example 11. The drain time was 90 seconds. The tensile strength was determined with the Thwing Albert model QCII-XS electronic tensile tester to be 890 psig (6136 KPa) with 99% elongation without break.

Example 26

A particle filled porous web was prepared as described in Example 13 from the sodium titanate/Goodrite 1800×73 particles described in Example 12. The drain time was 35 seconds.

Example 27

Into a 8.3 cm by 3.1 cm diameter tube capped at one end with a rubber stopper was placed approximately 50 g of sodium titanate/Goodrite 1800×73 particle from Example 12, which had not been vacuum dried. The particle was compacted as much as possible using hand pressure and then placed in the vacuum oven and dried at 130° C. and 709 Torr for 72 hours. When the material was cooled and removed from the oven, the material retained the cylindrical shape and did stick together to form a sponge-like mass. The tube was then used as a column with the cylindrical dried particle being used in the column for separation. The cylindrical dried particles were preconditioned with 0.1 M NaOH/5M $NaNO_3$ with a flow rate of 30 mL/min for 30 min. Deionized water was then passed through the column at 30 mL for 10 min. The TAN matrix was then passed through the column at 30 mL/min. for 4 hours. This column was very efficient in removing Ca, Mg, and Sr ions from the TAN matrix: pressure was about 7 KPa There were no detectable Ca, Sr, or Mg ions in the effluent. It was unexpected that the small average particle size (27 $\mu$m) resulted in low back pressure without channeling and with excellent separation.

Example 28

Capacity data was obtained by running $K_d$ determination using two different solutions: 1) TAN matrix with 3 ppm Sr, 545 ppm Ca, and 195 ppm Mg; and 2) a solution of 55 ppm Sr in 0.1 molar sodium hydroxide and 5 molar sodium nitrate. Data are as follows:

TABLE 1

Tan Matrix (2.5 ppm Sr)

| Particle Id | Example Number | Capacity (g Sr/g particle) | $K_d$ (mLg particle) |
|---|---|---|---|
| CST IE 910 (comparative) | 4 | 0.000436 | 43200 |
| CST/Goodrite 1800 × 73 | 1 | 0.000454 | 45400 |
| CST/Goodrite 1800 × 73 | 2 | 0.000445 | 44500 |
| Sodium Titanate (comparative) | 7 | 0.000380 | 1600 |
| Sodium Titanate/Goodrite 1800 × 73 | 5 | 0.000359 | 725 |

Capacities determined using Tan Matrix as in Table 1 and Table 2 show that the capacity of the spray dried particles as evaluated by $K_d$ determination did not deviate significantly from the starting material.

TABLE 2

Capacity and $K_d$ determination with TAN matrix (4 ppm Sr)

| Particle Id | Example Number | Capacity (g Sr/g particle) | $K_d$ (mL/g particle) |
|---|---|---|---|
| CST IE 910 (comparative) | 4 | 0.000766 | 7710 |
| CST/Goodrite 1800 × 73 | 2 | 0.000775 | 7750 |
| Sodium Titanate (comparative) | 7 | 0.000657 | 963 |
| Sodium Titanate/Goodrite 1800 × 73 | 5 | 0.000641 | 859 |
| Sodium Titanate/Hycar 26138 | 8 | 0.000590 | 563 |
| Sodium Titanate/Permax 801 | 9 | 0.000493 | 328 |
| Sodium Titanate/HG-54D | 10 | 0.000620 | 689 |
| Sodium Titanate/ML-200 | 11 | 0.000625 | 738 |

TABLE 3

Capacity and $K_d$ determination with 0.1M NaOH/5M $NaNO_3$ (54 ppm Sr)

| Particle Id | Example No. | Capacity (g Sr/g Particle) | $K_d$ (mL/g particle) | % Retention $K_d$ with binder/$K_d$ without binder |
|---|---|---|---|---|
| CST IE 910 (comparative) | 4 | 0.0199 | 600 | |
| CST/Goodrite 1800 × 73 | 2 | 0.00856 | 191 | 31.8 |
| Sodium Titanate/Goodrite 1800 × 73 | 5 | 0.00972 | 220 | 10 |
| Sodium Titanate (comparative) | 7 | 0.0363 | 2256 | |
| Sodium Titanate/Hycar 26138 | 8 | 0.0158 | 412 | 18 |
| Sodium Titanate/Permax 801 | 9 | 0.01746 | 487 | 22 |
| Sodium Titanate/HG-54D | 10 | 0.0205 | 638 | 28 |
| Sodium Titanate/ML-200 | 11 | 0.0125 | 306 | 13.6 |
| Sodium Titanate/no binder* | comparative | | 16,000 | |
| Sodium Titanate/cellulose acetate* | comparative | | <300 | <1.8 |
| Sodium Titanate/processed cellulose acetate* | comparative | | 1600 | 9.5 |

*comparative sample as prepared in WO97/14652, Example 21.

TABLE 4

Capacity and $K_d$ determination with 0.1M NaOH/5M $NaNO_3$ (57 ppm Sr)

| Particle Id | Example No. | Capacity (g Sr/g Particle) | $K_d$ (mL/g particle) | % Retention $K_d$ spray dried/$K_d$ not spray dried |
|---|---|---|---|---|
| Sodium Titanate (comparative) | 7 | 0.0357 | 2820 | — |
| Sodium Titanate (spray-dried, no binder) | 6 | 0.0432 | 4380 | 155 |

The data of Tables 3 and 4 show that sodium titanate particles with binders according to the present invention retained more sorptive capacity towards strontium than comparative sodium titanate after processing particles with cellulose acetate as binder as disclosed in WO97/14652. (WO97/14652 discloses a multi-step process to increase porosity and % retention from 1.8 to 9.5.) The data of Table 4 also show an increase in sorptive capacity for the spray dried material without binder (Example 6) compared with sodium titantate that has not been spray dried.

Example 29

Tensile strengths were determined both wet and dry. The wet tensile was evaluated in two ways. The first evaluation involved soaking the sample for 7 days in deionized water, removing the sample from the water and blotting the surface dry prior to testing. The second wet tensile evaluation involved soaking the sample for 7 days in NCAW (neutralized current acid waste from Hanford, Wash., see formulation below). The sample was removed from the NCAW and rinsed with deionized water twice; the surface was then blotted dry prior to testing. The tensile strength was determined using a Thwing Albert Model QCII-XS electronic tensile tester (Thwing Albert Instrument Company, Philadelphia, Pa.) equipped with a 227 Kg load cell at 10% load range.

TABLE 5

Tensile Strengths Dry versus Wet

| Particle Id | Example No. | Dry Tensile Strength Tensile Strength (KPa) | Wet Tensile strength (soaked 1 week in deionized water) Tensile Strength (KPa) | Wet Tensile (soaked 1 week in NCAW waste) Tensile Strength (KPa) |
|---|---|---|---|---|
| Sodium Titanate (comparative) | 17 | 8845 | 3373 | 2153 |
| Sodium Titanate/Goodrite 1800 × 73 | 19 | 6274 | 3192 | 2904 |
| Sodium Titanate/Goodrite 1800 × 73 | 20 | 406 | 209 | 190 |
| Sodium Titanate/Goodrite 1800 × 73 | 21 | 1516 | N/A | N/A |

The wet tensile strength, as expected, was lower than the dry tensile strength. The wet tensile strengths were very similar for both the deionized and NCAW samples. The most significant difference was for the sodium titanate comparative which had a difference of 64% between the two wet tensile strengths. The difference for the sodium titanate/Goodrite 1800×73 samples were both 91%. It is important to note that the retained strength even in NCAW, was sufficient for the material to perform as a usable SPE disk or cartridge.

NCAW Waste Simulant Composition

| Species | Molarity (M) |
|---|---|
| Na | 5.00 |
| K | 0.12 |
| Rb | 5.00E−5 |
| Al | 0.43 |
| $SO_4$ | 0.15 |
| OH (total) | 3.40 |
| OH (free) | 1.68 |
| $CO_3$ | 0.23 |
| $NO_2$ | 0.43 |
| $NO_3$ | 1.67 |
| F | 0.089 |
| $PO_4$ | 0.025 |
| Cs | 0.00051 |

NCAW (Neutralized current acid waste) simulant is considered to be representative of Hanford (Wash.) tank wastes. In actual tanks the concentration of Cs ranges from 1.0E-2 to 1.0E-5 M as Cesium nitrate.

Various modifications and alterations of this invention will become apparent to those skilled in the art without departing from the scope and intent of this invention, and it should be understood that this invention is not to be unduly limited to the illustrative embodiments set forth herein.

We claim:

1. A method for removing metal ions from solution comprising the steps of:

a) providing titanate particles by spray-drying a solution or slurry comprising titanate particles, optionally in the presence of an organic binder free of cellulose functionality, to produce monodisperse, substantially spherical sorbent titanate particles having an average particle size in the range of 1 to 100 micrometers, said titanate sorbents being active towards ions of metals in Periodic Table (CAS version) Groups IA, IIA, IB, IIB, IIIB, and VIII, and b) introducing the spray-dried titanate particles into a metal ion containing solution wherein the metal ions are selected from the group consisting of metal ions in Periodic Table (CAS version) Groups IA, IIA, IB, IIB, IIIB, and VIII, equilibrating the spray-dried titanate particles with the metal ion-containing solution, and then separating the titanate particles from the resulting effluent.

2. The method according to claim 1 wherein said titanate sorbents are selected from the group consisting of crystalline silicotitanates and alkali metal titanates.

3. The method according to claim 2 wherein said alkali metal titanate is sodium titanate.

4. The method according to claim 1 wherein said solution or slurry further comprises said binder.

5. The method according to claim 4 wherein said binder is an organic binder selected from the group consisting of olefin polymers and acrylate (co)polymers.

6. The method according to claim 5 wherein said binder is styrene butadiene copolymer.

7. The method according to claim 5 wherein said binder is selected from the group consisting of vinylidene halide emulsion, an acrylate copolymer, an acrylic colloidal dispersion, and a styrene acrylic solution.

8. The method according to claim 1 wherein said sorbent titanate particles are in a loose or agglomerated form.

9. The method according to claim 1 wherein said titanate particles are incorporated in a porous matrix, membrane or web.

10. The method according to claim 1 wherein said spray-drying comprises the steps of:

a) atomizing said titanate, and b) removing moisture from said atomized titanate.

11. The method according to claim 1 wherein said solution or slurry comprises at least one of aqueous and organic liquids.

12. The method according to claim 1 wherein said particles are in a column.

13. The method according to claim 1 wherein said spray-dried particles have been compressed into a porous, shaped article.

14. The method according to claim 1 wherein the yield of spray-dried titanate particles is at least 80 percent of theoretical yield.

15. The method according to claim 1 wherein said metals are selected from the group consisting of Sr, Cs, Am, Pu, and U.

16. The method according to claim 1 wherein the yield of spray-dried titanate particles is at least about 70 percent of theoretical yield.

17. The method according to claim 1 wherein less than about 15 percent of the particles produced are less than about 5 micrometers in size.

* * * * *